(12) United States Patent
Serkin et al.

(10) Patent No.: US 7,921,051 B2
(45) Date of Patent: Apr. 5, 2011

(54) SECURITY-BASED ORDER PROCESSING TECHNIQUE

(75) Inventors: Stuart Richard Serkin, Fairfield, CT (US); Robert Miller, Milford, CT (US); Timothy Vincent, Shelton, CT (US); Edward A. Perrault, Westport, CT (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1805 days.

(21) Appl. No.: 10/206,148

(22) Filed: Jul. 25, 2002

(65) Prior Publication Data

US 2003/0229567 A1 Dec. 11, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)

(52) U.S. Cl. ............................................. 705/37; 705/35

(58) Field of Classification Search ................ 705/1–50; 364/388; 707/10, E17.032, 999.009; 1/1; 726/2
See application file for complete search history.

(56) References Cited

U.S. PATENT DOCUMENTS

| | | | |
|---|---|---|---|
| 5,077,665 A | 12/1991 | Silverman et al. | |
| 5,101,353 A | 3/1992 | Lupien et al. | |
| 5,774,879 A | 6/1998 | Custy et al. | |
| 5,812,988 A | 9/1998 | Sandretto | |
| 5,827,071 A | 10/1998 | Sorensen et al. | |
| 5,924,082 A | 7/1999 | Silverman et al. | |
| 6,014,643 A * | 1/2000 | Minton | 705/36 R |
| 6,035,287 A | 3/2000 | Stallaert et al. | |
| 6,157,914 A | 12/2000 | Seto et al. | |
| 6,278,982 B1 | 8/2001 | Korhammer et al. | |
| 6,317,726 B1 | 11/2001 | O'Shaughnessy | |
| 6,317,728 B1 * | 11/2001 | Kane | 705/36 R |
| 6,442,533 B1 | 8/2002 | Hinkle | |
| 6,505,174 B1 | 1/2003 | Keiser et al. | |
| 6,601,044 B1 | 7/2003 | Wallman | |
| 7,110,975 B2 | 9/2006 | Marks de Chabris et al. | |
| 7,167,844 B1 | 1/2007 | Leong et al. | |
| 7,181,424 B1 | 2/2007 | Ketchum et al. | |
| 7,246,092 B1 | 7/2007 | Peterson et al. | |
| 2001/0034686 A1 | 10/2001 | Eder | |

(Continued)

OTHER PUBLICATIONS

Birsel T. Pirim, Bonnie F. Van Ness, Robert A. Van Ness, Can Security Characteristics and Market Structure Explain the Differences in Trading Costs between NYSE and NASDAQ Securities?, 2006, EuroJournals Publishings Inc, web, pp. 1-20.*

(Continued)

*Primary Examiner* — Mary Cheung
*Assistant Examiner* — Marissa Liu
(74) *Attorney, Agent, or Firm* — Fish & Richardson P.C.

(57) ABSTRACT

A system in an electronic securities market includes a configurable look-up table that has assignment entries that assign each of a plurality of securities to one or more securities processors in the system. Whenever an order is received that involves a specific security, a security look-up process accesses the configurable look-up table to determine which securities processor the specific security is assigned to. Once determined, a messaging process, which is responsive to the security look-up process, sends the received security order to the securities processor to which the specific security is assigned.

49 Claims, 6 Drawing Sheets

U.S. PATENT DOCUMENTS

| | | | |
|---|---|---|---|
| 2002/0138401 A1 | 9/2002 | Allen et al. | |
| 2002/0156716 A1 | 10/2002 | Adatia | |
| 2002/0198820 A1* | 12/2002 | Mills | 705/38 |
| 2003/0083973 A1 | 5/2003 | Horsfall | |
| 2003/0225671 A1 | 12/2003 | Miller et al. | |
| 2003/0225672 A1 | 12/2003 | Hughes, Jr. et al. | |
| 2003/0225673 A1 | 12/2003 | Hughes, Jr. et al. | |
| 2003/0225674 A1 | 12/2003 | Hughes, Jr. et al. | |
| 2003/0229557 A1 | 12/2003 | Richmann et al. | |
| 2003/0229566 A1 | 12/2003 | Moore et al. | |
| 2003/0229568 A1 | 12/2003 | Richmann et al. | |
| 2004/0143542 A1 | 7/2004 | Magill et al. | |

OTHER PUBLICATIONS

What is Main Memory? From http://www.webopedia.com/TERM/M/main_memory.html.

Computer Data Storage from http://en.wikipedia.org/wiki/computer_storage.

RAM: A Brief Introduction from http://www.linfo.org/ram.html.

John Wiley & Sons Ltd, Dictionary of Multimedia and Internet Applications: A Guide for Developers and Users, 1999, retrieved by xreferplus.com.

* cited by examiner

SECURITY-BASED ORDER PROCESSING TECHNIQUE

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002.

BACKGROUND

This invention relates to electronic-based securities trading, and more particularly to the processing of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a system in an electronic securities market includes a configurable look-up table that has assignment entries that assign each of a plurality of securities to one or more securities processors in the system. Whenever an order is received that involves a specific security, a security look-up process accesses the configurable look-up table to determine which securities processor the specific security is assigned to. Once determined, a messaging process, which is responsive to the security look-up process, sends the received security order to the securities processor to which the specific security is assigned.

One or more of the following features may also be included. The system further includes a securities processor that processes the received order. A trade data output process transmits trade data to recipients concerning the processing of the received security order. This trade data includes a share volume and a share price.

The assignment entries include security-specific entries that assign a single security to a specific securities processor, such that the specific securities processor processes received orders concerning the single security and other securities assigned to the specific securities processor. The assignment entries include dedicated entries that assign a single security to a dedicated securities processor, such that the dedicated securities processor only processes received orders concerning the single security. The assignment entries include ID-range entries that assign a range of securities to a specific securities processor. The assignment entries include floating entries that assign a single security to the next-available securities processor.

The configurable look-up table includes a specific entry table and a rule entry table.

The specific entry table includes one or more security-specific entries that assign a single security to a specific securities processor, such that the specific securities processor processes received orders concerning the single security and other securities assigned to the specific securities processor. The specific entry table includes one or more dedicated entries that assign a single security to a dedicated securities processor, such that the dedicated securities processor only processes received orders concerning the single security.

The rule entry table includes one or more id-range entries that assign a range of securities to a specific securities processor. The rule entry table includes one or more floating entries that assign a single security to the next-available securities processor.

The security look-up process is configured to first access the specific entry table to determine if the specific entry table includes an assignment entry for the specific security associated with the received order, such that the rule entry table is subsequently accessed if the appropriate assignment entry is not included in the specific entry table.

According to a further aspect of this invention, a method of routing securities orders in an electronic market includes accessing a configurable look-up table in response to a received order involving a specific security. The configurable look-up table includes assignment entries that assign each of a plurality of securities to one or more securities processors. The securities processor that the specific security is assigned to is then determined. The received security order is sent to the securities processor to which the specific security is assigned.

One or more of the following features may also be included. The received order is processed. Trade data concerning the processing of the received security order is transmitted to recipients. This trade data includes a share volume and a share price. The assignment entries include security-specific entries that assign a single security to a specific securities processor, such that the specific securities processor processes received orders concerning the single security and other securities assigned to the specific securities processor. The assignment entries include dedicated entries that assign a single security to a dedicated securities processor, such that the dedicated securities processor only processes received orders concerning the single security. The assignment entries include id-range entries that assign a range of securities to a specific securities processor. The assignment entries include floating entries that assign a single security to the next-available securities processor.

The configurable look-up table includes a specific entry table and a rule entry table.

The specific entry table includes one or more security-specific entries that assign a single security to a specific securities processor, such that this specific securities processor processes received orders concerning the single security and other securities assigned to the specific securities processor. The specific entry table includes one or more dedicated entries that assign a single security to a dedicated securities processor, such that the dedicated securities processor only processes received orders concerning the single security.

The rule entry table includes one or more id-range entries that assign a range of securities to a specific securities processor. The rule entry table includes one or more floating entries that assign a security to the next-available securities processor.

The specific entry table is first accessed to determine if it includes an assignment entry for the specific security associated with the received order. If it doesn't, the rule entry table is subsequently accessed.

According to a further aspect of this invention, a computer program product residing on a computer readable medium has a plurality of instructions stored on it. When executed by the processor, these instructions cause that processor to access a configurable look-up table in response to a received order involving a specific security. This configurable look-up table includes assignment entries that assign each of a plurality of securities to one or more securities processors. A determination is made concerning which securities processor the specific security is assigned to. This received security order is then sent to the securities processor to which the specific security is assigned.

One or more of the following features may also be included. The computer program product further includes instructions to process the received order, and to transmit trade data to recipients concerning the processing of the received security order. The configurable look-up table includes a specific entry table and a rule entry table.

The computer program product further includes instructions to access the specific entry table to determine if it includes an assignment entry for the specific security associated with the received order, such that the rule entry table is subsequently accessed if the appropriate assignment entry is not included in the specific entry table.

According to a further aspect of this invention, a method of processing a securities order in an electronic market includes receiving a message-based order involving a specific security. This message-based order is parsed to determine the specific security. A configurable look-up table is accessed to determine which of a plurality of security processors the specific security is assigned to. The message-based order is modified so that it identifies the security processor to which the specific security is assigned.

One or more of the following features may also be included. The message-based order is sent to the securities processor to which the individual security is assigned. Modifying the message-based order includes populating an existing header to include an identifier that designates the securities processor to which the individual security is assigned. Modifying the message-based order includes appending the message-based order to include header that designates the securities processor to which the individual security is assigned.

The message-based order is then processed and trade data is transmitted to recipients concerning the processing of the message-based order. The configurable look-up table includes assignment entries that assign each of a plurality of securities to one or more securities processors. The assignment entries include security-specific entries that assign a single security to a specific securities processor, such that the specific securities processor processes received orders concerning the single security and other securities assigned to the specific securities processor. The assignment entries include dedicated entries that assign a single security to a dedicated securities processor, such that the dedicated securities processor only processes received orders concerning the single security. The assignment entries include id-range entries that assign a range of securities to a specific securities processor. The assignment entries include floating entries that assign a single security to the next-available securities processor.

The configurable look-up table includes a specific entry table and a rule entry table. This configurable look-up table is configured to first access the specific entry table to determine if the specific entry table includes an assignment entry for the specific security associated with the received order, such that the rule entry table is subsequently accessed if the appropriate assignment entry is not included in the specific entry table.

One or more advantages can be provided from the above. By using a routing table to split the processing of trades amongst numerous securities processors, system throughput can be increased. In addition, by making this routing table easily reconfigurable, the assignment of securities to specific securities processors can be varied in response to changes in system use. Further, as the routing table allows additional securities processors to be added and tested prior to being put into actual use, system testing is simplified and system stability is enhanced. Additionally, the use of modular securities processors and a configurable routing table allows for a system that can grow and expand in accordance with its needs.

DETAILED DESCRIPTION

Figure 1:
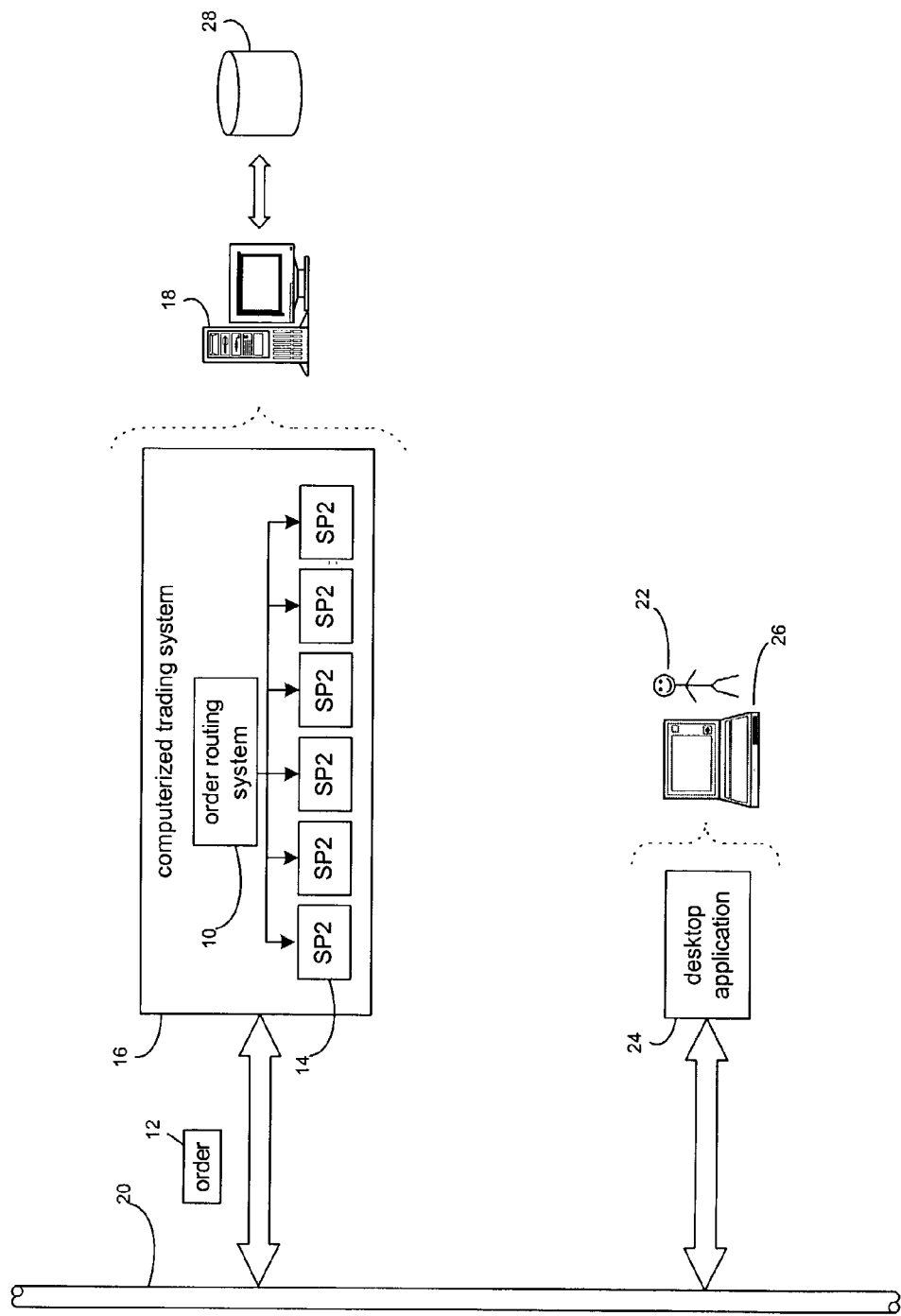
FIG. 1 is a block diagram of a computerized trading system including an order routing system and a securities processor.

Referring to FIG. 1, there is shown an order routing system 10 that directs received orders, for buying or selling securities 12, to a securities processor (e.g., securities processor 14) that is assigned to a specific security. Order routing system 10 is incorporated into and part of a computerized trading system 16 that trades securities, including the specific security that is the subject of received order 12. The securities processor processes the security order and effectuates the trading of the security. By assigning certain securities to certain securities processors, a single securities processor is not required to process all of the orders handled by the computerized trading system 16. Accordingly, load balancing of the individual securities processors within the system can be controlled and the overall efficiency and throughput of the system is enhanced.

Order routing system 10 resides on a server 18 that is connected to network 20 (e.g., the Internet, an intranet, a local area network, some other form of network, etc.). Computerized trading system 16 trades securities electronically, processes trades (e.g., order 12) entered by various market participants (e.g., market participant 22). Market participant 22 typically accesses and uses computerized trading system 16 via a desktop application 24 (e.g., Microsoft Internet Explorer™, Netscape Navigator™, the Nasdaq Workstation II™, a specialized desktop interface, etc.) running on computer 26, thus allowing market participant 22 to trade securities with other market participants (not shown).

The instruction sets and subroutines of order routing system 10 and securities processor 14 are typically stored on a storage device 28 connected to server 18. Additionally, computerized trading system 16 stores all information relating to securities trades on storage device 28. Storage device 28 can be a hard disk drive, a tape drive, an optical drive, a RAID array, a random access memory (RAM), or a read-only memory (ROM), for example.

Server 18 includes at least one central processing unit (not shown) and main memory system (not shown). Typically, server 18 is a multi-processing, fault-tolerant system that includes multiple central processing units that each have a dedicated main memory system or share a common main memory pool. While being executed by the central processing unit(s) of server 18, order routing system 10 and multiple instantiations of securities processor 14 reside in the main memory system of server 18. Further, the processes and subroutines of order routing system 10 and securities processor 14 may also be present in various levels of cache memory incorporated into server 18.

Figure 2:
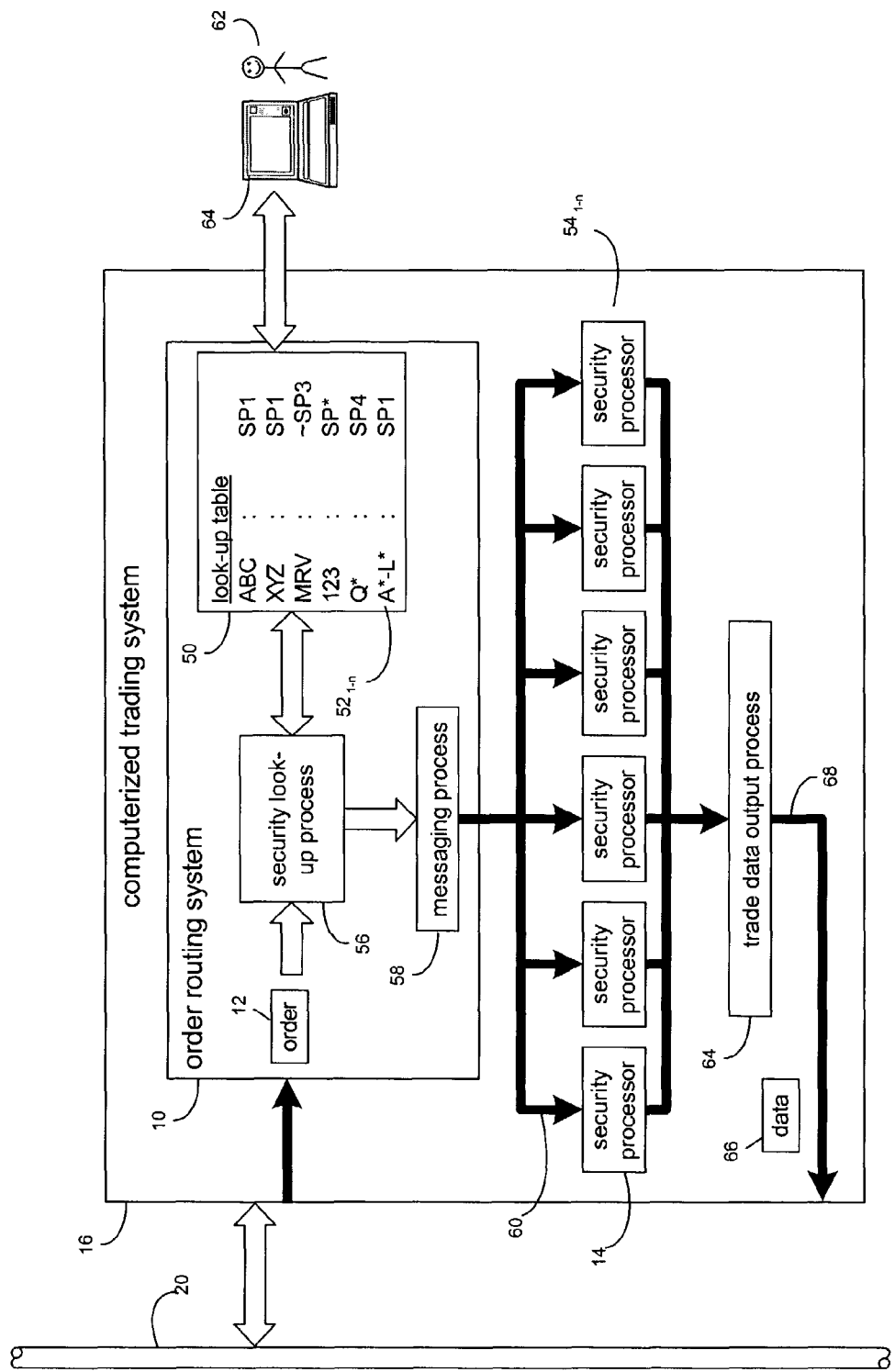
FIG. 2 is a block diagram of the order routing system.

Referring to FIG. 2, order routing system 10 includes a configurable look-up table 50 that includes assignment entries $52_{1-n}$ that assign each of the securities traded on computerized trading system 16 to one or more securities processors $54_{1-n}$. Look-up table 50 can be configured in various forms. For example, table 50 can be in the form of a multi-column, multi-row text-based ASCII (i.e., American Standard Code for Information Interchange) file that is accessed to determine the assigned securities processor. Alternatively, look-up table 50 may be a database from which a query is made concerning the security and the appropriate database record is retrieved, such that this database record specifies the securities processor to which that specific security is assigned. Other file arrangements/structures are also possible, such as a comma delimited text file.

During the course of the trading day and, possibly, before and after the trading day, market participants (e.g., market participant 22) places orders (e.g., order 12) for securities traded on computerized trading system 16. These orders, which are typically in the form of messages, include several pieces of information, such as: the name of the market participant who placed the order; a symbol (or some other identifier) for the security being sought for purchase or offered for sale; and a quantity indicator concerning the number of shares sought for purchase or offered for sale, for example.

When a market participant 22 places an order 12, the order is transmitted to computerized trading system 16 via network 20. Upon receipt of order 12, a security look-up process 56 parses order 12 to determine the security to which the order relates. Typically, security-look-up process 56 will examine order 12 to find a ticker symbol (or some other identifier) for the security to which the order pertains. Assume that, for this example, order 12 pertains to one-hundred shares of XYZ Corp. that Market Participant A wishes to purchase for $17.00 per share. Security lookup process 56 parses this order and extracts the ticker symbol XYZ that is included in the message body. Alternatively, some other form of identifier can be used (e.g., a binary identifier) provided that assignment entries $52_{1-n}$ use these identifiers to assign the securities processors.

Security look-up process 56 accesses configurable look-up table 50 to determine the securities processor to which ticker symbol XYZ is assigned. As is shown configurable look-up table 50, security XYZ is assigned to securities processor SP1. Depending on the structure of table 50 (e.g., ASCII table, database, text file, etc), security look up process 56 may scan table 50 (if it is an ASCII table or text file), or may launch a query (if it is a database) to determine which securities processor the security is assigned to. As order 12 is typically in the form of a message, once the determination is made, messaging process 58 populates the header of the message to include an identifier for that securities processor. Alternatively, order 12 may be appended to include a header that identifies the assigned securities processor. Once this process is complete, order 12 is broadcast over bus 60 to the assigned securities processor (securities processor 14, for example).

Figure 3:
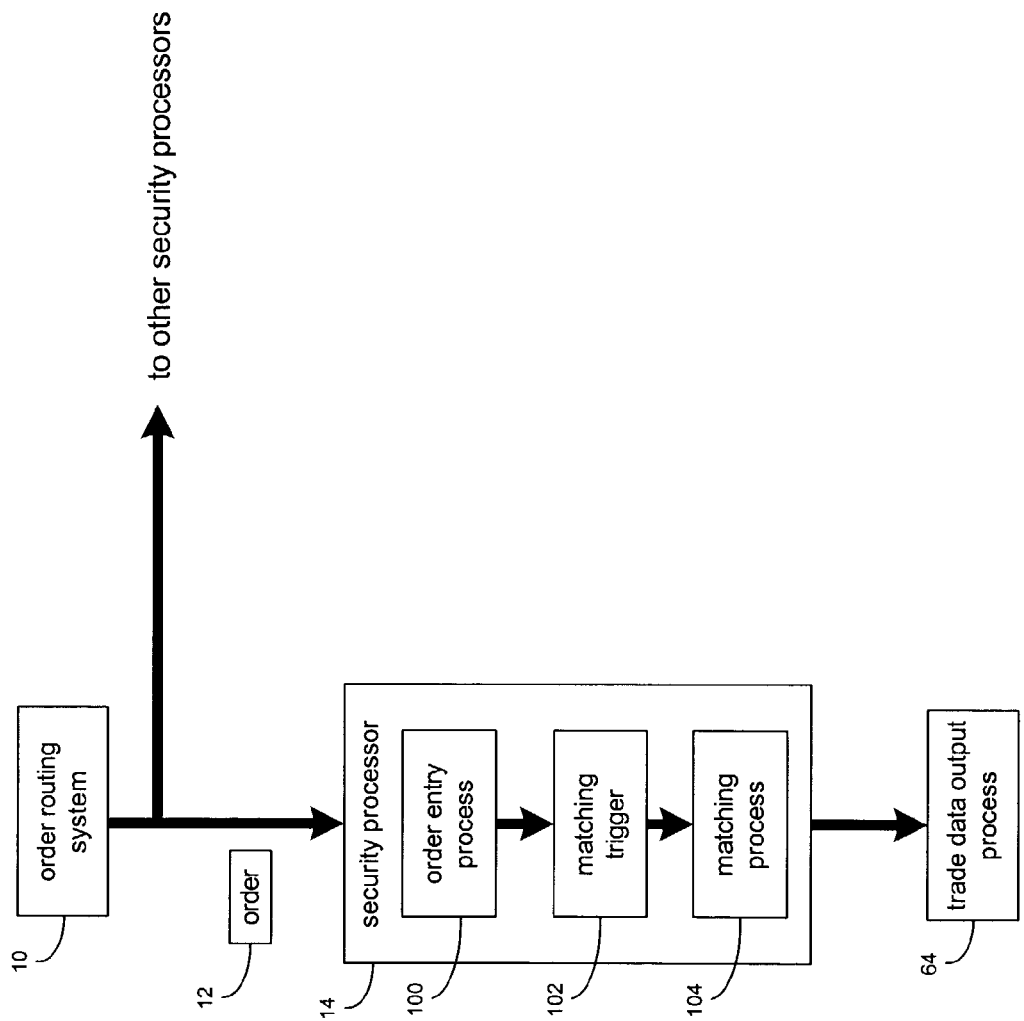
FIG. 3 is a block diagram of the securities processor.

Referring to FIG. 3, once order 12 is received by the securities processor 14, a check is performed by order entry process 100 to make sure that the order passes certain preliminary checks (e.g., order eligibility, order syntax, etc.). The specifics of the checks being performed and the action taken in response to a failure is configured by administrator 62 using computer 64. Typically, if an order fails any of these checks, the order is rejected and the market participant who placed the order is notified.

If the order is validated by order entry process 100, order 12 is passed to matching trigger 102. Matching trigger 102 functions as a queue for those orders that are received by the securities processor but have not been processed yet. In addition, matching trigger 102 has other pending orders, quotes, deliveries, and supervisory commands for the securities assigned to the securities processor 14. These supervisory commands are also routed to the appropriate securities processor by order routing system 10.

Once queued by matching trigger 102, these orders/commands wait in line to be processed by matching process 104. When available, matching process 104 retrieves the next-inline order/command (order 12, for example) so that it could be processed. As stated above, order 12 pertains to one-hundred shares of XYZ Corp. that Market Participant A wishes to purchase for $17.00 per share. This order, which represents a bid-to-buy XYZ Corp. is entered into the order book (not shown) for securities processor 12 for subsequent matching with a corresponding offer-to-sell XYZ Corp.

During the course of the day, the trade value of the security (XYZ Corp., for example) will vary as market conditions fluctuate. Whenever a market participant is offering a security for sale at the same price that another market participant is willing to pay for the security, matching process 104 executes a trade between those two market participants. However, if the highest bid (hereinafter buy) is lower than the lowest offer (hereinafter sell), the security will not be traded and these pending bids and offers will remain on the security order book. This price differential between the lowest offer-to-sell and the highest bid-to-buy is commonly referred to as the "spread".

Whenever an order is executed in the form of a trade, an order fails to match with another outstanding offer within a predetermined period of time (e.g., immediately, during the trading day, etc.), or an order is rejected by order entry process 100, a trade data output process 64 transmits trade data 66 to the market participant who placed the order. This trade data will vary depending on the action taken by securities processor 14. For example, if the order was rejected, the market participant will typically receive a message specifying that the order was rejected and the reasons for the rejection (e.g., negative volume, negative share price, etc.). If the order was executed, the market participant may receive a message specifying that the order was executed and defining the number of shares sold and the per-share price. Further, if the order failed to execute, the message received by the market participant would typically specify the reason for the failure (e.g., order did not execute immediately, order did not execute by the close of trading, etc.). These notification messages are broadcast across output bus 68, which is connected to network 14.

Administrator 62 (via computer 64 and a configuration utility running on it) can configure and reconfigure configurable look-up table 50 to vary the individual loading of the securities processors $54_{1-n}$ or the overall load of the computerized trading system 16. The manner in which table 50 is modified varies depending on the configuration of the table. If the table is an ASCII-based table or text file, a simple text or ASCII line editor may be used to assign and reassign securities to various securities processors. Alternatively, if table 50 is configured as a database, database editing/configuration software (such as that offered by Sybase®, Microsoft®, and Oracle®) may be used to add, delete, or modify records within the database.

As explained above, the actual trading of the orders placed by the market participants is handled by the securities processors incorporated into computerized trading system 16. The greater the number of securities processors employed, the greater the throughput of computerized trading system 16.

Specifically, as the number of securities processors is increased, the number of trades that system 16 is capable of handling is also increased.

As would be expected, bigger well-know securities tend to be traded at higher volumes than smaller less-known securities. Accordingly, administrator 62 may assign one or more of their highest volume securities to a single securities processor, such that another securities processor handles all the remaining securities. Additionally, as the look-up table is reconfigurable, these definitions can be reassigned as trading trends vary. For example, assume that XYZ Corp. is the highest traded stock handled by computerized trading system 16 and, therefore, administrator 62 only assigned XYZ Corp. to the first of the six securities processors, such that the second through the sixth securities processors handle the trades of all other securities traded on the system 16. If, over time, XYZ Corp. starts to trade less frequently and ABC Corp. (another security traded on computerized trading system 16) becomes the highest traded security, administrator 16 could easily reassign XYZ Corp. so that it is processed by any of securities processors two through six, thus freeing up the first securities processor to exclusively process trades of ABC Corp.

Since additional securities processors can be added to system 10 to accommodate higher trade volumes, computerized trading system 10 is scalable. For example, if administrator 62 decided that the load level of all six securities processors were too high and, therefore, reassigning securities from one securities processor to another would not free up any bandwidth, a seventh securities processor can be added to system 16. This new securities processor would be given a unique address or identifier and look-up table 50 would be modified so that one or more securities are assigned to this newly added securities processor. Additionally, as these securities processor are each autonomous processors that run separately and independently of each other, the new securities processor may be added and tested without jeopardizing the stability of computerized trading system 16. For example, a seventh securities processor may be added and, prior to the system executing trades of actual securities, this new securities processor can be tested. A batch test-procedure can be used to trade "test" securities to verify the securities processor's reliability prior to actually using the new securities processor in the system. Once the reliability of the new securities processor is established, look-up table 50 can be modified to assign actual securities to that newly-added securities processor.

Concerning the types of assignment entries $52_{1-n}$ that are included in look-up table 50, these entries may be security-specific assignment entries; dedicated assignment entries; id-range assignment entries; or floating assignment entries, for example. Each of these will be discussed below in greater detail.

A security-specific assignment entry is an assignment entry that assigns a specific security (or security symbol) to a specific security processor. An example of a security-specific assignment entry is "XYZ:SP1", in that it assigns security XYZ Corp. to securities processor SP1. However, securities processor SP1 is available to also process trades concerning other securities.

A dedicated assignment entry is an assignment entry that assigns a security to a dedicated securities processor, such that this dedicated securities processor only processes trades concerning that one security. If look-up table 50 does not use wildcards (to be discussed below), every assignment would function as a dedicated assignment until a second security was assigned to the same securities processor. An example of this type of dedicated assignment would be "MRV:SP3", since no other security is assigned to securities processor SP3. However, if assignment entries are made that use wildcards (to be discussed below), the dedicated assignment entry would have to indicate that the securities processor is exclusively assigned. An example of this type of dedicated assignment is "MRV:~SP3", such that the "~" prefix before the SP3 would be indicative of the exclusivity and, therefore, prevent wildcard assignments from assigning any other securities to securities processor SP3.

An id-range assignment entry is an assignment entry that assigns a range of securities to a specific securities processor. For example, securities beginning with the letters A-L may be assigned to securities processor SP1. The corresponding id-range assignments is "A*-L*:SP1". Note the use of the wildcard symbol "*" to identify any combination beginning with a certain character. Further, these id-range assignments may specify a range of securities beginning with certain numbers, such as "1*-9*:SP3".

A floating assignment entries is an entry that assigns a specific security to any one of a range of securities processors. For example, security 123 may be assigned to the next-available securities processor. Typically, this type of assignment is performed on lower-priority, lightly-traded securities. An example of this type of floating assignment is "123:SP*", such that the wildcard character is used to represent the securities processor assignment. Note that if such wildcard securities processor assignments are used, any dedicated assignment would have to indicate exclusivity for a securities processor to avoid a floating assignment assigning a security to a dedicated securities processor.

Figure 4:
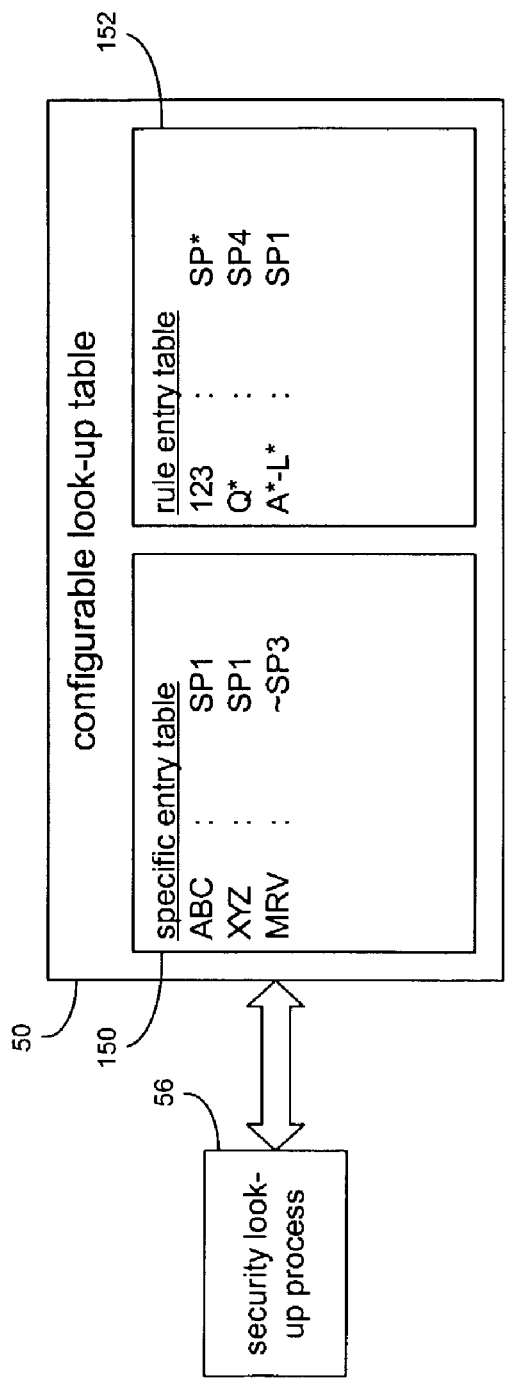
FIG. 4 is a block diagram of a configurable look-up table.

Referring to FIG. 4, look-up table 50 may be configured to include a specific-entry table 150 and a rule-entry table 152. Specific entry table 150 includes security-specific assignment entries (e.g., XYZ:SP1) and dedicated assignment entries (e.g., MRV:~SP3). Rule entry table 154 includes id-range assignment entries (e.g., A*-L*:SP1) and floating assignment entries (e.g., 123:SP*).

If look-up table 50 is configured to include a specific entry table 152 and a rule entry table 154, security look-up process 56 is configured to first access and search the specific entry table 152 to determine if it includes an assignment entry for the security associated with a received order. If table 152 includes such an entry, security look-up process 56 will stop searching table 50. However, if table 152 does not include such an entry, security look-up process 56 will access and search rule-entry table 154 to determine if it includes an assignment entry for the security associated with the received order.

While FIGS. 1 and 2 are shown to include six securities processors, the actual number of securities processors varies depending on, among other things, system loading and trade volume.

While specific examples were given concerning security-specific assignment entries, dedicated assignment entries, id-range assignment entries, and floating assignment entries, the structure and nomenclature of these entries is for illustrative purposes only. Specifically, administrator 62 and/or the designer of system 16 may choose a nomenclature or syntax that is different than the above-stated examples.

Figure 5:
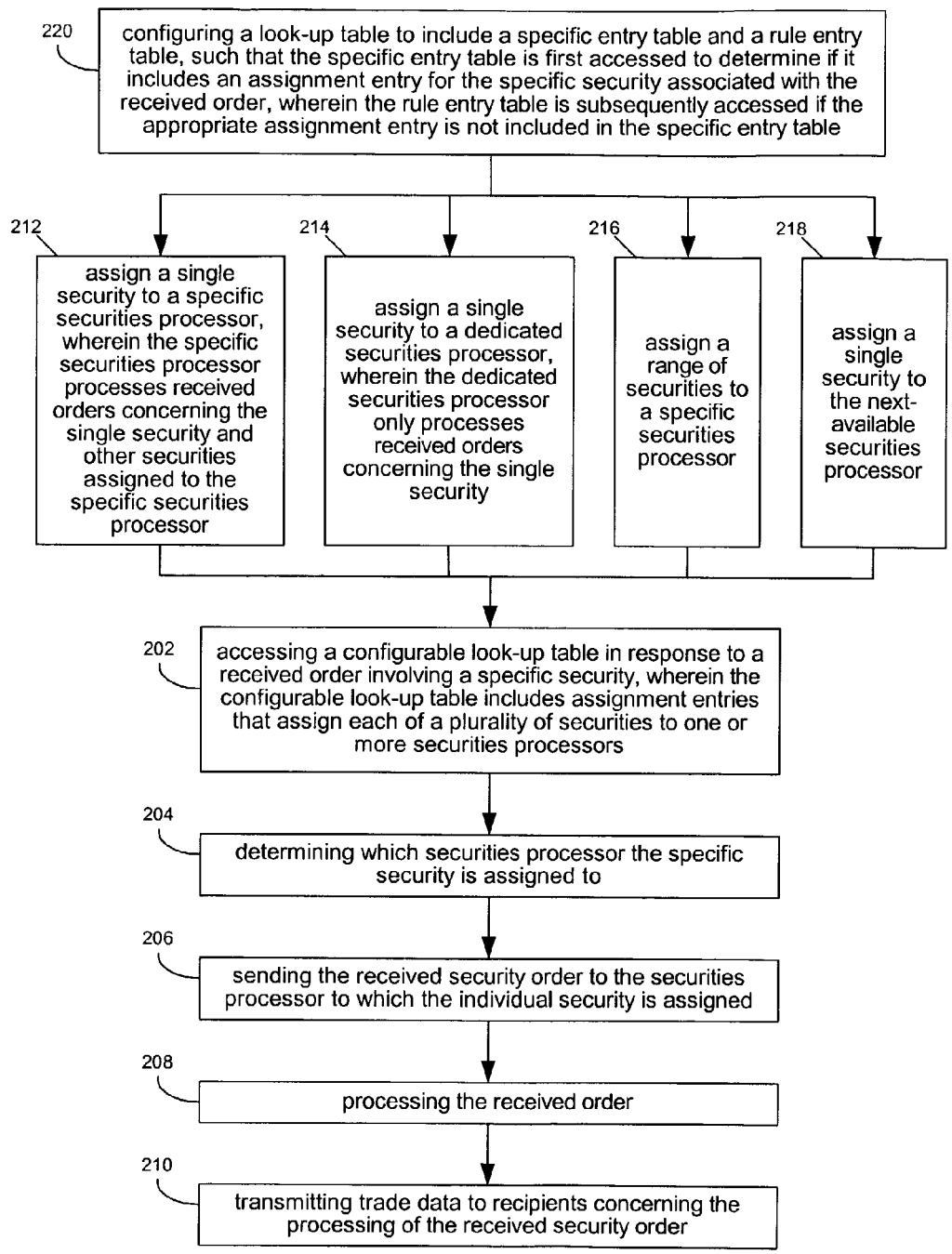
FIG. 5 is a block diagram of an order routing method.

Referring to FIG. 5, a process 200 of routing securities orders in an electronic market includes accessing 202 a configurable look-up table in response to a received order involving a specific security. The configurable look-up table includes assignment entries that assign each of a plurality of securities to one or more securities processors. A determination 204 is made concerning the securities processor that the specific security is assigned to. The received security order is sent 206 to the securities processor to which the specific security is assigned. The received order is processed 208 and trade data concerning the processing of the received security order is transmitted 210 to recipients. This trade data includes a share volume and a share price.

The assignment entries include security-specific entries that assign 212 a single security to a specific securities processor, such that the specific securities processor processes received orders concerning the single security and other securities assigned to the specific securities processor. The assignment entries include dedicated entries that assign 214 a single security to a dedicated securities processor, such that the dedicated securities processor only processes received orders concerning the single security. The assignment entries include id-range entries that assign 216 a range of securities to a specific securities processor. The assignment entries include floating entries that assign 218 a single security to the next-available securities processor.

The configurable look-up table includes a specific entry table and a rule entry table. The specific entry table is first accessed 220 to determine if it includes an assignment entry for the specific security associated with the received order. If it doesn't, the rule entry table is subsequently accessed 222.

The specific entry table includes the security-specific entries and the dedicated entries, and the rule entry table includes the id-range entries and the floating entries.

Figure 6:
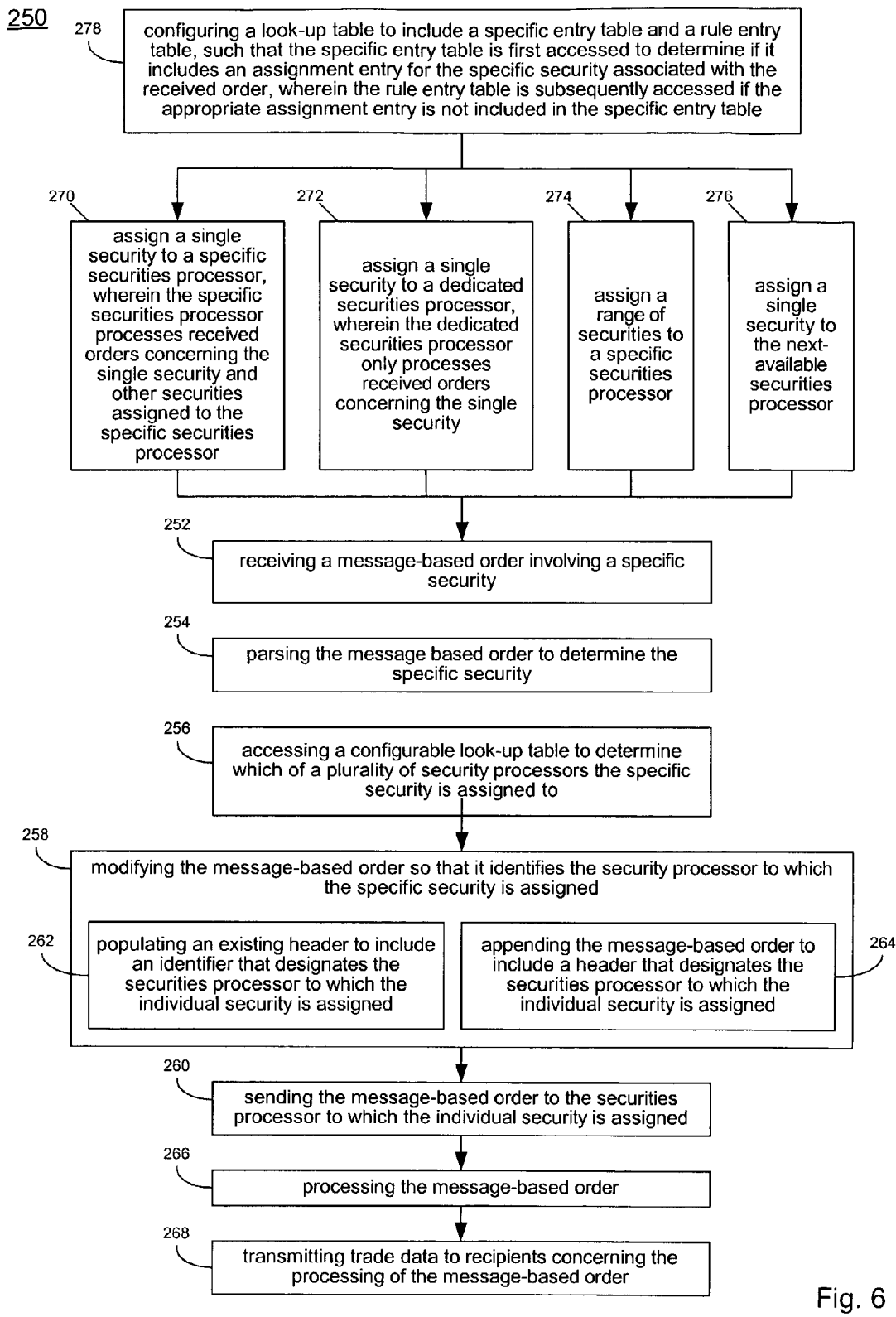
FIG. 6 is a block diagram of a securities order processing method.

Referring to FIG. 6, a process 250 for handling a securities order in an electronic market includes receiving 252 a message-based order involving a specific security. This message-based order is parsed 254 to determine the specific security referenced by the order. A configurable look-up table is accessed 256 to determine which of a plurality of security processors the specific security is assigned to. The message-based order is modified 258 so that it identifies the security processor to which the specific security is assigned.

The message-based order is sent 260 to the securities processor to which the individual security is assigned. Modifying the message-based order includes populating 262 an existing header to include an identifier that designates the securities processor to which the individual security is assigned. Modifying the message-based order includes appending 264 the message-based order to include a header that designates the securities processor to which the individual security is assigned.

The message-based order is processed 266 and trade data concerning the processing of the message-based order is transmitted 268 to recipients. The configurable look-up table includes assignment entries that assign each of a plurality of securities to one or more securities processors.

The assignment entries include security-specific entries that assign 270 a single security to a specific securities processor, such that the specific securities processor processes received orders concerning the single security and other securities assigned to the specific securities processor. The assignment entries include dedicated entries that assign 272 a single security to a dedicated securities processor, such that the dedicated securities processor only processes received orders concerning the single security. The assignment entries include id-range entries that assign 274 a range of securities to a specific securities processor. The assignment entries include floating entries that assign 276 a single security to the next-available securities processor.

The configurable look-up table includes a specific entry table and a rule entry table. The configurable look-up table is configured 278 to first access the specific entry table to determine if the specific entry table includes an assignment entry for the specific security associated with the received order, such that the rule entry table is subsequently accessed if the appropriate assignment entry is not included in the specific entry table.

The order routing system described herein is not limited to the hardware embodiment described above; it may find applicability in any computing or processing environment. The order routing system may be implemented in hardware, software, or a combination of the two. For example, the order routing system may be implemented using circuitry, such as one or more of programmable logic (e.g., an ASIC), logic gates, a processor, and a memory.

The order routing system may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The order routing system may also be implemented as a machine-readable storage medium, configured with a computer program, where, upon execution, instructions in the computer program cause a machine to operate to perform the functions of the order routing system described above.

Embodiments of the order routing system may be used in a variety of applications. Although the order routing system is not limited in this respect, the order routing system may be implemented with memory devices in microcontrollers, general purpose microprocessors, digital signal processors (DSPs), reduced instruction-set computing (RISC), and complex instruction-set computing (CISC), among other electronic components.

Embodiments of the order routing system may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A system in an electronic securities market, the system comprising:
    a processing device;
    main memory coupled to the processing device; and
    a first computer readable medium storing a computer program product, the computer program product comprising instructions to cause the processing device to:
        populate a configurable look-up table with assignment entries to assign each of a plurality of securities to one or more securities processors in the system, with each assignment determining which security processor will execute an order for that specific security, with the configurable look-up table including a specific entry table and a rule entry table and with the rule entry table including one or more id-range entries that assign a range of securities to a specific securities processor;

access the configurable look-up table in response to receiving an order involving a specific security, with assignment entries in the configurable look-up table to determine which securities processor the specific security is assigned to; and send the received security order to the securities processor to which the specific security is assigned.

2. The system of claim 1 further comprising:

a securities processor;

a second computer readable medium storing a computer program product, the computer program product comprising instructions to cause the securities processor to: process the received order.

3. The system of claim 2, wherein the second computer program product further comprises instructions to cause the securities processor to:

transmit trade data to recipients concerning the processing of the received security order in response to processing the received order.

4. The system of claim 3 wherein the trade data includes a share volume and a share price.

5. The system of claim 1 wherein the assignment entries include security-specific entries that assign a single security to a specific securities processor, with the specific securities processor processing received orders concerning the single security and other securities assigned to the specific securities processor.

6. The system of claim 1 wherein the assignment entries include dedicated entries that assign a single security to a dedicated securities processor, with the dedicated securities processor processing only received orders concerning the single security.

7. The system of claim 1 wherein the assignment entries include security id-range entries that assign a range of securities to a specific securities processor.

8. The system of claim 1 wherein the assignment entries include floating entries that assign a single security to the next-available securities processor.

9. The system of claim 1 wherein the specific entry table includes one or more security-specific entries that assign a single security to a specific securities processor, with the specific securities processor processing received orders concerning the single security and other securities assigned to the specific securities processor.

10. The system of claim 1 wherein the specific entry table includes one or more dedicated entries that assign a single security to a dedicated securities processor, with the dedicated securities processor processing only received orders concerning the single security.

11. The system of claim 1 wherein the rule entry table includes one or more floating entries that assign a single security to the next-available securities processor.

12. The system of claim 1 wherein the security look-up process is configured to first access the specific entry table to determine if the specific entry table includes an assignment entry for the specific security associated with the received order, with the rule entry table being subsequently accessed if an appropriate assignment entry is not included in the specific entry table.

13. A computer implemented method of routing securities orders in an electronic market, the method comprising:

accessing, by one or more computer systems a configurable look-up table stored in a computer storage medium, in response to a received order involving a specific security, the configurable look-up table including assignment entries that assign each of a plurality of securities to one or more securities processors, each assignment entry determining which security processor will execute an order for that specific security, with the configurable look-up table including a specific entry table and a rule entry table and with the rule entry table including one or more id-range entries that assign a range of securities to a specific securities processor;

determining by the one or more computer systems which securities processor the specific security is assigned to; and sending the received security order to the securities processor to which the specific security is assigned for processing of the order involving the specific security.

14. The method of claim 13 further comprising processing the received order to fulfill the received order.

15. The method of claim 14 further comprising:

transmitting trade data to recipients concerning the processing of the received security order.

16. The method of claim 15 wherein the trade data includes a share volume and a share price.

17. The method of claim 13 wherein the assignment entries include security-specific entries that assign a single security to a specific securities processor, with the specific securities processor processing received orders concerning the single security and other securities assigned to the specific securities processor.

18. The method of claim 13 wherein the assignment entries include dedicated entries that assign a single security to a dedicated securities processor, with the dedicated securities processor processing only received orders concerning the single security.

19. The method of claim 13 wherein the assignment entries include floating entries that assign a single security to the next-available securities processor.

20. The method of claim 19 wherein the specific entry table includes one or more security-specific entries that assign a single security to a specific securities processor, with this specific securities processor processing received orders concerning the single security and other securities assigned to the specific securities processor.

21. The method of claim 19 wherein the specific entry table includes one or more dedicated entries that assign a single security to a dedicated securities processor, with the dedicated securities processor processing only received orders concerning the single security.

22. The method of claim 19 wherein the rule entry table includes one or more id-range entries that assign a range of securities to a specific securities processor.

23. The method of claim 19 wherein the rule entry table includes one or more floating entries that assign a security to the next-available securities processor.

24. The method of claim 19 further comprising first accessing the specific entry table to determine if the specific entry table includes an assignment entry for the specific security associated with the received order, wherein the rule entry table is subsequently accessed if the appropriate assignment entry is not included in the specific entry table.

25. A computer program product residing on a computer readable medium having a plurality of instructions stored thereon which, when executed by a processor, cause that processor to:

access a configurable look-up table in response to a received order involving a specific security, wherein the configurable look-up table includes assignment entries that assign each of a plurality of securities to one or more securities processors, each assignment entry determining which security processor will execute an order for that specific security, with the configurable look-up table including a specific entry table and a rule entry table and with the rule entry table including one or more id-range entries that assign a range of securities to a specific securities processor;

determine which securities processor the specific security is assigned to; and send the received security order to the securities processor to which the specific security is assigned.

26. The computer program product of claim 25 further comprising instructions to process the received order.

27. The computer program product of claim 26 further comprising instructions to transmit trade data to recipients concerning the processing of the received security order.

28. The computer program product of claim 25, the computer program product further comprising instruction to: access the specific entry table to determine if it includes an assignment entry for the specific security associated with the received order, wherein the rule entry table is subsequently accessed if the appropriate assignment entry is not included in the specific entry table.

29. A computer implemented method of processing a securities order in an electronic market, the method comprising:

receiving a message-based order involving a specific security;

parsing by one or more computer systems the message-based order to determine the specific security;

accessing by one or more computer systems a configurable look-up table to determine which of a plurality of security processors the specific security is assigned to for executing an order, with the configurable look-up table including a specific entry table and a rule entry table and with the rule entry table including one or more id-range entries that assign a range of securities to a specific securities processor; and modifying by one or more computer systems the message-based order so that it identifies the security processor to which the specific security is assigned.

30. The method of claim 29 further comprising sending the message-based order to the securities processor to which the individual security is assigned.

31. The method of claim 29 wherein modifying the message-based order includes populating an existing header to include an identifier that designates the securities processor to which the individual security is assigned.

32. The method of claim 29 wherein modifying the message-based order includes appending the message-based order to include a header that designates the securities processor to which the individual security is assigned.

33. The method of claim 29 further comprising processing the message-based order.

34. The method of claim 33 further comprising transmitting trade data to recipients concerning the processing of the message-based order.

35. The method of claim 29 wherein the configurable look-up table includes assignment entries that assign each of a plurality of securities to one or more securities processors.

36. The method of claim 35 wherein the assignment entries include security-specific entries that assign a single security to a specific securities processor, wherein the specific securities processor processes received orders concerning the single security and other securities assigned to the specific securities processor.

37. The method of claim 35 wherein the assignment entries include dedicated entries that assign a single security to a dedicated securities processor, wherein the dedicated securities processor only processes received orders concerning the single security.

38. The method of claim 35 wherein the assignment entries include floating entries that assign a single security to the next-available securities processor.

39. The method of claim 35 further comprising first accessing the specific entry table to determine if the specific entry table includes an assignment entry for the specific security associated with the received order, wherein the rule entry table is subsequently accessed if the appropriate assignment entry is not included in the specific entry table.

40. A computer system in an electronic securities market that is comprised of a plurality of computer systems that process security orders, the computer system comprising:

a processor; and a memory storing:

a configurable look-up table that includes a specific entry table, a rule entry table, and assignment entries to assign each of a plurality of securities to one or more securities processors in the system, each assignment entry determining which security processor will execute an order for that specific security, with the configurable look-up table including a specific entry table and a rule entry table and with the rule entry table including one or more id-range entries that assign a range of securities to a specific securities processor; and instructions to cause the processor to:

access the configurable look-up table in response to a received order involving a specific security and to determine which securities processor the specific security is assigned to; and send the received security order to the securities processor to which the specific security is assigned.

41. The computer system of claim 40 further comprising: a securities processor for processing the received order.

42. The computer system of claim 41, wherein the instructions further comprise instructions to:

transmit trade data to recipients concerning the processing of the received security order.

43. The computer system of claim 42 wherein the trade data includes a share volume and a share price.

44. The computer system of claim 40 wherein the specific entry table includes one or more security-specific entries that assign a single security to a specific securities processor, with the specific securities processor processing received orders concerning the single security and other securities assigned to the specific securities processor.

45. The computer system of claim 40 wherein the specific entry table includes one or more dedicated entries that assign a single security to a dedicated securities processor, with the dedicated securities processor processing only received orders concerning the single security.

46. The computer system of claim 40 wherein the rule entry table includes one or more floating entries that assign a single security to the next-available securities processor.

47. The computer system of claim 40 wherein the security look-up process is configured to first access the specific entry table to determine if the specific entry table includes an assignment entry for the specific security associated with the received order, with the rule entry table being subsequently accessed if an appropriate assignment entry is not included in the specific entry table.

48. A computer implemented method of processing a securities order in an electronic market, the method comprising:

accessing by one or more computer systems a configurable look-up table in response to a received order involving a specific security, the configurable look-up table including a specific entry table, a rule entry table, and assignment entries that assign each of a plurality of securities to one or more securities processors for executing an order and with the rule entry table including one or more id-range entries that assign a range of securities to a specific securities processor;

determining by one or more computer systems which securities processor the specific security is assigned to;

sending by one or more computer systems a message including the securities order to the securities processor to which the specific security is assigned for processing of the securities order.

49. The method of claim 48 further comprising first accessing the specific entry table to determine if the specific entry table includes an assignment entry for the specific security associated with the received order, wherein the rule entry table is subsequently accessed if the appropriate assignment entry is not included in the specific entry table.

* * * * *